United States Patent
Tsukasaki et al.

(10) Patent No.: US 9,802,639 B2
(45) Date of Patent: Oct. 31, 2017

(54) STEERING APPARATUS

(71) Applicant: SUBARU CORPORATION, Tokyo (JP)

(72) Inventors: Yuichiro Tsukasaki, Tokyo (JP); Masaru Kogure, Tokyo (JP); Hiroyuki Ooiwa, Tokyo (JP); Mitsuharu Minami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 17 days.

(21) Appl. No.: 15/014,763

(22) Filed: Feb. 3, 2016

(65) Prior Publication Data
US 2016/0221599 A1  Aug. 4, 2016

(30) Foreign Application Priority Data
Feb. 4, 2015  (JP) .................. 2015-020546

(51) Int. Cl.
*B62D 3/12*  (2006.01)
*F16H 19/04*  (2006.01)
*F16H 57/12*  (2006.01)

(52) U.S. Cl.
CPC ............ *B62D 3/126* (2013.01); *F16H 19/04* (2013.01); *F16H 57/12* (2013.01)

(58) Field of Classification Search
CPC  B62D 3/162; B62D 3/12; F16H 19/04; F16H 57/12
See application file for complete search history.

(56) References Cited

U.S. PATENT DOCUMENTS 2,973,658 A * 3/1961 Bishop ............... B62D 3/12
                                                    180/428
4,582,334 A * 4/1986 Tashiro ............. B62D 7/1527
                                                    180/410
(Continued)

FOREIGN PATENT DOCUMENTS

JP        49-8922 A      1/1974
JP      57-179573 U     11/1982
(Continued)

OTHER PUBLICATIONS

Masato Yanagimoto, Jan. 28, 1974, JPO, JP 49-008922 A, English Translation.*

(Continued)

*Primary Examiner* — James A English
(74) *Attorney, Agent, or Firm* — McDermott Will Emery LLP

(57) ABSTRACT

A steering apparatus includes: a pinion shaft coupled to a steering wheel and having a pinion; a rack shaft having a rack engaged with the pinion and a shaft back located on opposite side of the rack with an axial center of the rack shaft in between; a rack shaft housing that houses and slidably supports the rack shaft; and a rack shaft supporting mechanism having a pressure applying member that applies a pressure onto the shaft back toward the pinion. The shaft back includes a predetermined region provided across a midpoint of the rack which corresponds to a neutral position of the steering wheel. The predetermined region is a right-to-left steering wheel angle region having a height higher than a height of any other region of the shaft back.

3 Claims, 3 Drawing Sheets

(56) References Cited

U.S. PATENT DOCUMENTS

2008/0271557 A1* 11/2008 Hubberstey ............... B64C 9/24
                                                                           74/422
2012/0248724 A1* 10/2012 Watanabe ................ B62D 3/12
                                                                           280/93.514
2015/0291205 A1* 10/2015 Nishitani ............... B62D 3/123
                                                                           74/409

FOREIGN PATENT DOCUMENTS

| JP | DE-3332483 A1 * | 3/1984 | ............. B62D 3/126 |
|----|----|----|----|
| JP | S59-116278 U | 8/1984 | |
| JP | H10-100927 A | 4/1998 | |
| JP | H10-324251 A | 12/1998 | |
| JP | 2005-219539 A | 8/2005 | |

OTHER PUBLICATIONS

Saga et al., Rack steering, German Patent Office, DE 33 32 483 A1, English Abstract.*
Saga et al., Rack steering, German Patent Office, DE 33 32 483 A1, Machine Translation of Description.*
Notification of Reasons for Refusal Japanese Patent Application No. 2015-020546 dated May 24, 2016 with full English translation.
Notification of Reasons for Refusal issued in Japanese Patent Application No. 2015-020546, dated May 16, 2017, with English language translation.

* cited by examiner (A)  (B)

STEERING APPARATUS

CROSS-REFERENCE TO RELATED APPLICATIONS

The present application claims priority from Japanese Patent Application No. 2015-020546 filed on Feb. 4, 2015, the entire contents of which are hereby incorporated by reference.

BACKGROUND

The technology relates to a steering apparatus that reduces a flutter vibration, transmitted as a reverse input to a rack shaft housing.

External force containing various vibration components is applied as a reverse input to a steering system of a vehicle upon running. The reverse input is transmitted to a steering shaft through a rack shaft and a steering gear box which structure a steering apparatus, resulting in occurrence of a so-called steering vibration of the steering shaft.

A flutter vibration is a typical example of the steering vibration. The flutter vibration is a micro-vibration which is caused by an imbalance between tires and which shakes a steering wheel circumferentially in a wiggling fashion. The flutter vibration occurs notably upon high-speed running of the vehicle.

To reduce the flutter vibration, a technique is known that makes it difficult for the flutter vibration to be transmitted to a region on the steering shaft side, by applying high friction force to an axial sliding movement of the rack shaft in the steering gear box or to rotation of a pinion shaft. On the other hand, increasing the friction force in the steering gear box impairs returning of the steering wheel, which in turn necessitates a tuning work performed depending on a vehicle type and thus requires a cumbersome work.

To address the impairment, a method may be contemplated in which the returning of the steering wheel is controlled by means of an electric power steering apparatus. The method, however, may impair a feeling upon performing regular steering.

Japanese Unexamined Patent Application Publication (JP-A) No. 2005-219539 discloses a technique in which, upon detecting a frequency component attributed to the flutter vibration in high-speed running, an assist signal adapted to cancel out the frequency component is added to a motor instruction current that drives an electric power steering. Thus, the electric power steering is driven in a direction by which the flutter vibration is offset to attenuate the flutter vibration.

SUMMARY

A technique disclosed in JP-A No. 2005-219539 attenuates a flutter vibration by causing an electric power steering apparatus to resonate with a phase reverse to that of the flutter vibration. This cancelling control, however, is executed after detection of a frequency component attributed to the flutter vibration, which means that there are easier occurrence of a control delay and a limitation in efficient attenuation of the flutter vibration. There is also room for improvement, in terms of versatility, in that the technique disclosed in JP-A No. 2005-219539 is not applicable to a hydraulic power steering apparatus.

It is desirable to provide a steering apparatus that makes it possible, by means of a simple structure, to reduce a flutter vibration to be transmitted to a steering wheel.

An aspect of the technology provides a steering apparatus that includes: a pinion shaft coupled to a steering wheel and having a pinion; a rack shaft having a rack engaged with the pinion and a shaft back located on opposite side of the rack with an axial center of the rack shaft in between, in which the shaft back includes a predetermined region provided across a midpoint of the rack which corresponds to a neutral position of the steering wheel, and the predetermined region is a right-to-left steering wheel angle region having a height higher than a height of any other region of the shaft back; a rack shaft housing that houses and slidably supports the rack shaft; and a rack shaft supporting mechanism having a pressure applying member that applies a pressure onto the shaft back toward the pinion.

DETAILED DESCRIPTION

In the following, some implementations of the technology are described in detail with reference to the accompanying drawings. In the following implementation, a description is given with reference to an electric power steering apparatus as a non-limiting example of a power steering apparatus.

Figure 1:
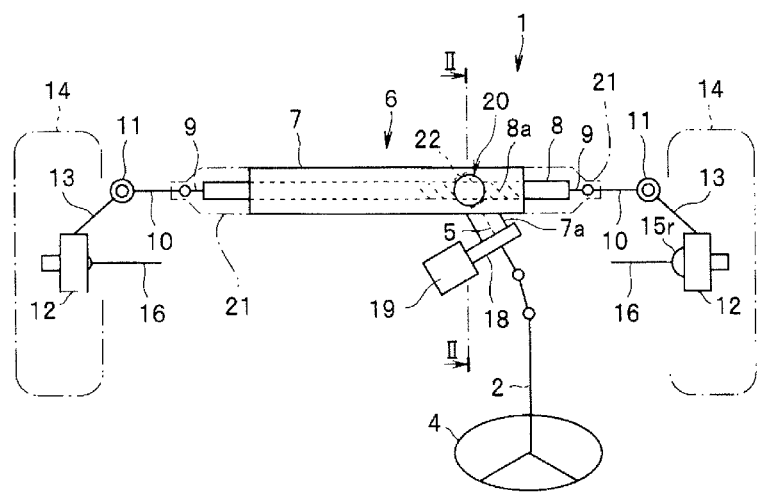
FIG. 1 schematically illustrates a power steering apparatus as a whole when a steering wheel is in neutral.

Referring to FIG. 1, an electric power steering apparatus 1 may include a steering shaft 2 rotatably supported by a vehicle body frame via an unillustrated steering column. The steering shaft 2 may have a first end extending toward a driver's seat and a second end extending toward an engine room. The first end of the steering shaft 2 may be attached with a steering wheel 4, whereas the second end may be coupled to a pinion housing 7a. The pinion housing 7a may pivotably support a steering pinion shaft (hereinafter referred to as a "pinion shaft") 5 provided in a steering gear box 6 described below.

The steering gear box 6 may be disposed in the engine room and extend right and left in a vehicle width direction, and may include a rack shaft housing 7. The rack shaft housing 7 so supports a rack shaft 8 as to be slidable axially in a reciprocating fashion. The rack shaft 8 is formed with a rack 8a that is in engagement with a pinion 5a formed on the pinion shaft 5, structuring a rack-and-pinion steering gear mechanism.

Both ends on the right and left sides of the rack shaft 8 may protrude from respective ends of the rack shaft housing 7, and each may be coupled to a tie rod 9. A tie rod end 10 provided integrally with the tie rod 9 may be coupled, through a ball joint 11, to a knuckle arm 13 that extends from a steering knuckle 12. The steering knuckle 12 may pivotably support a corresponding steering tire (corresponding one of the right and left front tires) 14, and steerably supported by the unillustrated vehicle body frame via a front arm 16. A connection at which the rack shaft 8 and the tie rod 9 are coupled to each other may be covered with a dust boot 21 attached to the rack shaft housing 7.

The pinion shaft 5 may be coupled to an electric motor 19 via an assist transmission mechanism 18. The electric motor 19 may allow for assistance of steering torque to be applied to the steering wheel 4. With this configuration, when the steering shaft 2 and the pinion shaft 5 are rotated in response to a driver's operation of the steering wheel 4 upon which the steering torque is assisted by the electric motor 19, the rotation of the pinion shaft 5 may move the rack shaft 8 right and left. The movement of the rack shaft 8 may roll the steering knuckles 12 to steer the steering tires 14 right and left.

The rack 8a may be provided at a position displaced on one side of the rack shaft 8 (displaced on the right side in FIG. 1). When the steering wheel 4 is at a neutral position, a substantially middle part of the rack 8a may be brought into engagement with the pinion 5a provided on the pinion shaft 5. A rack shaft supporting mechanism 20 is provided in a region facing the pinion 5a with the rack shaft 8 in between, i.e., a region above the pinion 5a with the rack shaft 8 in between in FIG. 1. The rack shaft supporting mechanism 20 so supports the rack shaft 8 as to be slidable axially, and presses (i.e., applies a pressure onto) the rack 8a against the pinion 5a.

Figure 2:
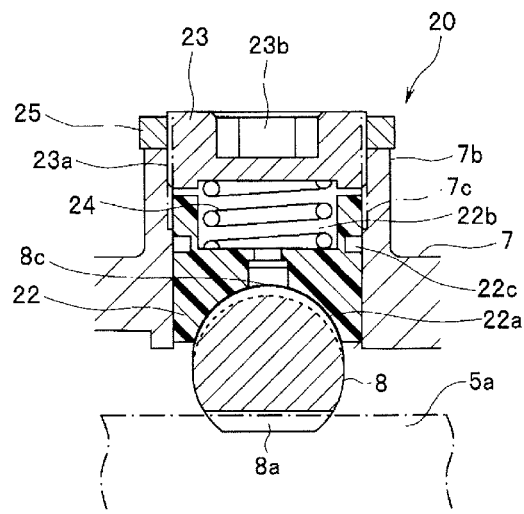
FIG. 2 is a cross-sectional view of a rack shaft supporting mechanism taken along line II-II of FIG. 1.
Figure 3:
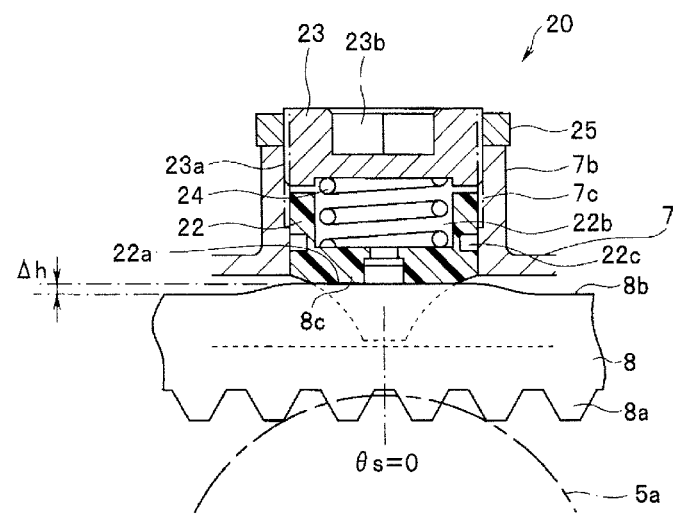
FIG. 3 is a cross-sectional view of the left side of the rack shaft supporting mechanism illustrated in FIG. 2.
Figure 4:
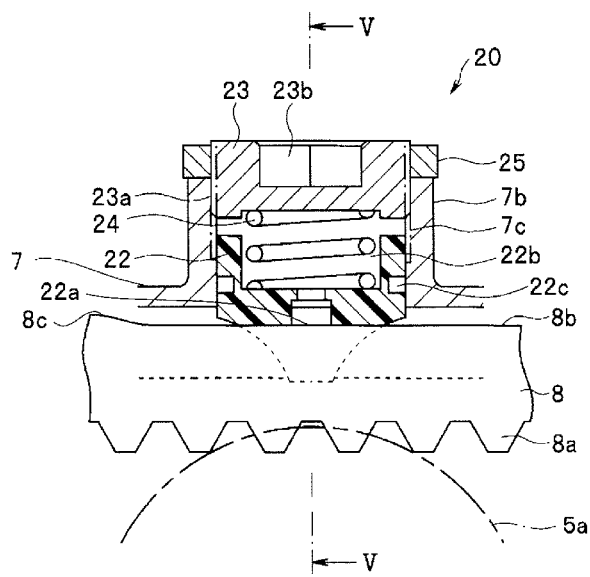
FIG. 4 is a cross-sectional view of the rack shaft supporting mechanism corresponding to FIG. 3 and in which the steering wheel is turned.
Figure 5:
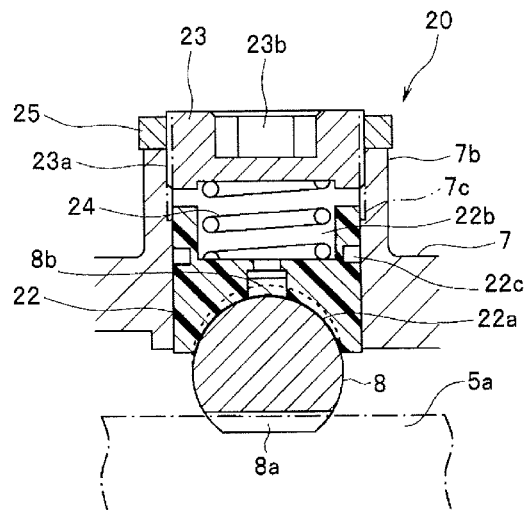
FIG. 5 is a cross-sectional view of the rack shaft supporting mechanism taken along line V-V of FIG. 4.

Referring to FIGS. 2 and 3, the rack shaft supporting mechanism 20 may be mounted in a rack shaft guide housing (hereinafter simply referred to as a "guide housing") 7b formed in a protruding fashion on the rack shaft housing 7. The guide housing 7b may be formed at a position opposing the pinion 5a with the rack shaft 8 in between.

The rack shaft supporting mechanism 20 provided in the guide housing 7b may include a rack shaft guide 22. The rack shaft guide 22 may have a columnar shape, and may be formed with a rack shaft slidable contact surface 22a in a region in which the rack shaft 8 comes into slidable contact with the rack shaft guide 22. The rack shaft slidable contact surface 22a may have a semicircular cross-section, and may so support a shaft back 8b of the rack shaft 8 as to be slidable axially in a reciprocating fashion. The shaft back 8b is located on the opposite side of the rack 8a with an axial center O1, illustrated in FIG. 6, of the rack shaft 8 in between. A region between the rack shaft slidable contact surface 22a and a surface of the rack shaft 8 may be filled with a lubricant such as grease.

A surface of the rack shaft guide 22 on the opposite side of the rack shaft slidable contact surface 22a may have a spring accommodating recess 22b. An axial circumferential surface of the rack shaft guide 22 may have a sealing groove 22c in which an unillustrated seal ring such as an O-ring may be mounted to keep a sealing property between an outer circumference of the rack shaft guide 22 and an inner wall of the guide housing 7b.

The guide housing 7b may have an opening whose inner circumference may be provided spirally with an internal thread 7c. The internal thread 7c may be engaged with an external thread 23a provided spirally on an outer circumference of a spring bearing plug 23.

The spring bearing plug 23 may include a base end surface having an engagement hole 23b to be engaged with a fastening tool. The fastening tool and the engagement hole 23b may respectively be, for example but not limited to, a hex wrench and a hexagon hole. A base end of the spring bearing plug 23 may protrude from the guide housing 7b to allow the external thread 23a to be exposed. The exposed external thread 23a may be engaged with a locknut 25, allowing the spring bearing plug 23 to be fixed to the guide housing 7b by fastening the locknut 25.

The spring accommodating recess 22b of the rack shaft guide 22 may have an opened base, and accommodate an adjust spring 24 as a non-limiting example of a pressure applying member. The adjust spring 24 may have a base end in contact with a bearing surface of the spring bearing plug 23, and provide pressure applying force that causes the rack shaft slidable contact surface 22a formed on the rack shaft guide 22 to press and apply (i.e., bias) a pressure onto the rack shaft 8 toward the pinion 5a.

Figure 7:
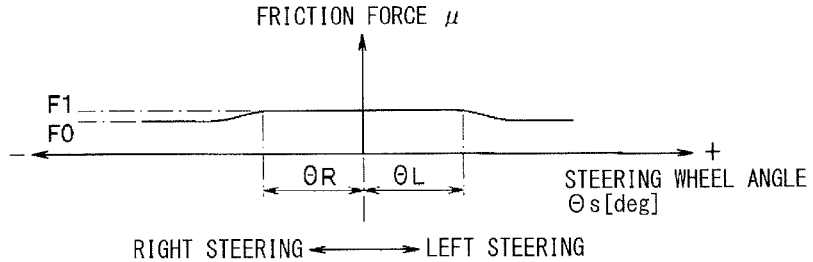
FIG. 7 is a characteristic diagram illustrating a relationship of a steering wheel angle that indicates an amount of movement of the rack shaft versus friction force.

Referring to FIGS. 2, 3, and 7, a shaft back (hereinafter referred to as a "rack midpoint shaft back") 8c in the shaft back 8b of the rack 8a formed on the rack shaft 8 is formed higher by a height $\Delta h$ than any other region of the shaft back 8b. The rack midpoint shaft back 8c includes a predetermined right-to-left steering wheel angle region ($\theta L$-$\theta R$) provided across a middle point of the rack 8a, i.e., a rack midpoint (where a steering wheel angle $\theta s$ equals to zero ($\theta s$=0)). The rack midpoint is a position corresponding to the neutral position of the steering wheel 4.

When the steering wheel 4 is located at or near the neutral position upon, for example, straight running on an expressway, a driver holds the steering wheel 4 lightly and is more likely to feel the flutter vibration accordingly. In contrast, the driver hardly feels the flutter vibration strongly when, for example, avoiding a forward obstacle or making a sudden lane change upon high-speed running, because the driver turns the steering wheel 4 against restoring force (self-aligning torque) applied to the steering wheel 4. The right-to-left steering wheel angle region ($\theta L$-$\theta R$) mentioned above may be set based on an experiment or a simulation, performed in advance for each vehicle type, of a region in which a driver feels the flutter vibration strongly.

Figure 6:
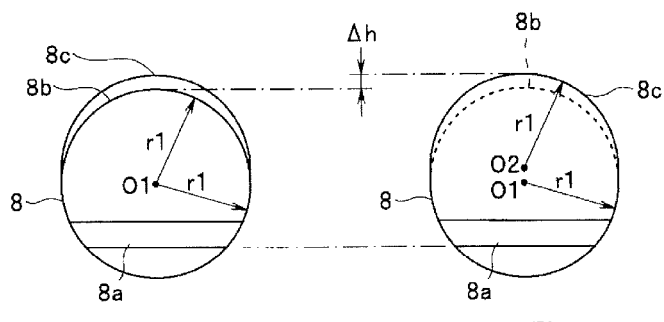
FIG. 6 is a cross-sectional view of a rack shaft, in which (A) illustrates a cross-section of the rack shaft corresponding to FIG. 5, and (B) illustrates a cross-section of the rack shaft corresponding to FIG. 2.

Referring to (A) of FIG. 6, shaft parts which are continuous to and located on right and left sides of the above-described rack midpoint shaft back 8c of the rack shaft 8 each may be formed to have a shape of a round bar having a radius r1 around the first axial center O1. Referring to (B) of FIG. 6, the rack midpoint shaft back 8c may be formed to have a shape of an arc having the radius r1 around a second axial center O2 that is displaced by the height $\Delta h$ from the first axial center O1 toward the shaft back. Thus, the rack midpoint shaft back 8c may have an oval-shaped cross-section in which regions displaced with respect to the first axial center O1 and the second axial center O2 are connected together by their respective tangents as illustrated in (B) of FIG. 6.

With this configuration, when the rack midpoint shaft back 8c in the right-to-left steering wheel angle region ($\theta L$-$\theta R$) of the rack 8a formed on the rack shaft 8 is brought into slidable contact with the rack shaft slidable contact surface 22a formed on the rack shaft guide 22 of the rack shaft supporting mechanism 20 as illustrated in FIG. 2, the rack shaft guide 22 is pressed by the height $\Delta h$ by means of reaction force derived from the rack 8a. This in turn causes the rack shaft guide 22 to recede and compresses the adjust spring 24 by the height $\Delta h$ accordingly, increasing the spring pressure relatively.

Next, a description is given of an operation of the implementation based on the configuration described above. Referring to FIGS. 2 and 3, when the steering wheel 4 is located at or near the neutral position, i.e., when the steering wheel angle θs falls within the predetermined right-to-left steering wheel angle region θL-θR provided across the neutral position as illustrated in FIG. 7, the rack shaft guide 22, facing the pinion 5a engaged with the rack 8a formed on the rack shaft 8, is in slidable contact with the rack midpoint shaft back 8c of the rack shaft 8.

The rack midpoint shaft back 8c is formed higher by the height Δh than any other region of the shaft back 8b. Thus, the adjust spring 24 is compressed when the region of the rack midpoint shaft back 8c is caused to travel over the rack shaft guide 22. Under such circumstances, a spring pressure F1 that presses the pinion 5a is higher than a set pressure F0 that presses any other region of the shaft back 8b as illustrated in FIG. 7, increasing the engagement between the rack 8a and the pinion 5a and a contact pressure between the rack midpoint shaft back 8c and the rack shaft slidable contact surface 22a formed on the rack shaft guide 22.

As a result, friction force μ that acts on the axial movement of the rack shaft 8 in the steering gear box 6 is increased, making it difficult for the flutter vibration derived from the right and left front tires 14 to be transmitted to the steering wheel 4. Hence, it is possible to eliminate the necessity to hold the steering wheel 4 tightly even upon running on a straight track of an expressway at high speed, and to achieve a favorable steering feeling. Also, the friction force μ is dependent on the spring pressure that compresses the adjust spring 24. Hence, it is possible to achieve the optimal friction force μ for each vehicle type by adjusting the height Δh of the rack midpoint shaft back 8c.

When the steering wheel 4 is turned beyond the right-to-left steering wheel angle region θL-θR illustrated in FIG. 7 to avoid a forward obstacle, make a sudden lane change, or go round a curve having a relatively small curvature at the junction, etc., the shaft back 8b of the rack shaft 8 comes into slidable contact with the rack shaft slidable contact surface 22a of the rack shaft guide 22. Under such circumstances, the pressing force applied to the adjust spring 24 returns to the set pressure F0, which in turn causes the friction force μ to return to a normal value and thereby prevents returning of the steering wheel 4 from being impaired. Hence, it is possible to achieve a favorable steering feeling in this case as well.

In the foregoing implementation, the rack midpoint shaft back 8c in the predetermined right-to-left steering wheel angle region θL-θR, provided across the rack midpoint corresponding to the neutral position of the steering wheel 4 and in which the driver feels the flutter vibration strongly, is higher by the height Δh than any other region of the shaft back 8b. In the right-to-left steering wheel angle region θL-θR, the spring pressure F1 that the rack shaft 8 receives from the adjust spring 24 becomes higher than the set pressure F0.

Hence, the friction force μ in the steering gear box 6 is increased in the predetermined right-to-left steering wheel angle region θL-θR in which the driver feels the flutter vibration strongly, making it difficult for the flutter vibration, transmitted as a reverse input from the steering tires 14 to the steering gear box 6, to be transmitted further toward the steering wheel 4. When the steering wheel 4 is turned beyond the right-to-left steering wheel angle region θL-θR, the rack shaft slidable contact surface 22a of the rack shaft guide 22 comes into slidable contact with the shaft back 8b, returning the spring pressure of the adjust spring 24 to the set pressure F0.

As a result, even when the flutter vibration is generated upon, for example, the high-speed running of the expressway, the transmission of the flutter vibration to the steering wheel 4 is less likely in the straight running and the favorable steering feeling is achieved accordingly, whereas the returning of the steering wheel 4 is prevented from being impaired by virtue of returning of the spring pressure to the set pressure F0 upon, for example, performing a sudden steering wheel operation and the favorable steering feeling is achieved accordingly.

Also, the rack midpoint shaft back 8c, formed on the rack shaft 8 in the predetermined right-to-left steering wheel angle region θL-θR in which the driver feels the flutter vibration strongly, is made high in height, achieving a simple configuration. Also, this configuration may require no electric control, making it possible to apply the implementation to any power steering apparatus, including the electric power steering apparatus and a hydraulic power steering apparatus, and thereby to achieve high versatility.

Further, the rack midpoint shaft back 8c may have the same radius r1 as the shaft back 8b in any other region, preventing a reduction in area that comes into slidable contact with the rack shaft slidable contact surface 22a of the shaft guide 22 and thus preventing occurrence of play between the rack midpoint shaft back 8c and the rack shaft slidable contact surface 22a. Hence, it is possible to smoothly slide the rack shaft 8.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A steering apparatus, comprising:
a pinion shaft coupled to a steering wheel and having a pinion;
a rack shaft having a rack engaged with the pinion and a shaft back located on an opposite side of the rack with an axial center of the rack shaft in between, the shaft back including a predetermined region provided across a midpoint of the rack which corresponds to a neutral position of the steering wheel, and the predetermined region including a right-to-left steering wheel angle region having a height higher than a height of any other region of the shaft back;
a rack shaft housing that houses and slidably supports the rack shaft; and
a rack shaft supporting mechanism having a pressure applying member that applies a pressure onto the shaft back toward the pinion,
wherein the predetermined region includes:
a midpoint region;
a first edge region disposed at one edge of the predetermined region in an extending direction of the axial center of the rack shaft;
a second edge region disposed at another edge of the predetermined region opposite to the one edge in the extending direction of the axial center of the rack shaft;
a first intermediate region disposed between the midpoint region and the first edge region; and
a second intermediate region disposed between the midpoint region and the second edge region,
wherein a distance, in a direction perpendicular to the extending direction of the axial center of the rack shaft, from a top of the midpoint region to any other region of the shaft back maintains constant along the extending direction of the axial center of the rack shaft, wherein a distance, in the direction perpendicular to the extending direction of the axial center of the rack shaft, from the first intermediate region to any other region of the shaft back decreases gradually from the midpoint region to the first edge region, wherein a distance, in the direction perpendicular to the extending direction of the axial center of the rack shaft, from the second intermediate region to any other region of the shaft back decreases gradually from the midpoint region to the second edge region, and wherein, in the extending direction of the axial center of the rack shaft, a width of the midpoint region is greater than that of any of the first and second intermediate regions.

2. The steering apparatus according to claim 1, wherein a first cross section of the shaft back in the midpoint region and a second cross section of the shaft back in any other region have a same radius, and each of the first cross section and the second cross section is perpendicular to the axial center of the rack shaft.

3. The steering apparatus according to claim 2, wherein the rack shaft supporting mechanism further comprises an rack shaft guide having a rack shaft slidable surface, the rack shaft slidable surface is configured to slidably contact with the shaft back and has a third cross section having a semicircular shape, and the third cross section is perpendicular to the axial center of the rack shaft.

* * * * *